United States Patent [19]

Mayer et al.

[11] Patent Number: 4,975,118
[45] Date of Patent: Dec. 4, 1990

[54] RECORDING FLUID CONTAINING PHENYL AZO NAPHTHALENE DYES FOR THE INK JET PROCESS

[75] Inventors: Udo Mayer, Frakenthal; Rainer Dyllick-Brenzinger, Weinheim; Horst Bruder, Ludwigshafen, all of Fed. Rep. of Germany; Steven J. Bares, Corvallis, Oreg.

[73] Assignee: BASF Aktiengesellschaft, Ludwigshafen, Fed. Rep. of Germany

[21] Appl. No.: 302,354

[22] Filed: Jan. 27, 1989

[30] Foreign Application Priority Data

Jan. 29, 1988 [DE] Fed. Rep. of Germany ....... 3802615

[51] Int. Cl.$^5$ ................. C09B 62/04; C09B 35/38; C09B 35/58; C09D 11/02
[52] U.S. Cl. ................. 106/22; 534/797; 534/800; 534/604
[58] Field of Search ............. 106/22; 534/797, 800

[56] References Cited

U.S. PATENT DOCUMENTS

| | | | |
|---|---|---|---|
| 4,544,737 | 10/1985 | Stohr et al. | 534/605 |
| 4,703,113 | 10/1987 | Baxter et al. | 106/22 X |
| 4,764,599 | 8/1988 | Colberg et al. | 106/22 X |
| 4,771,129 | 9/1988 | Kawashita et al. | 106/22 X |
| 4,777,248 | 10/1988 | Greenwoop | 106/22 X |

FOREIGN PATENT DOCUMENTS 2019873 11/1979 United Kingdom ............. 534/797

*Primary Examiner*—Floyd D. Higel
*Attorney, Agent, or Firm*—Oblon, Spivak, McClelland, Maier & Neustadt

[57] ABSTRACT

A recording fluid for the ink jet process contains a water-miscible organic solvent and a dye of the formula

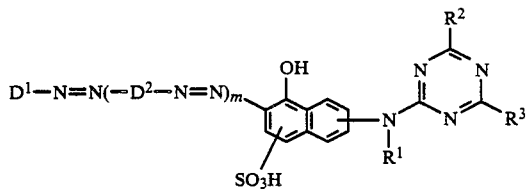

where
m is 0 or 1,
$D^1$ and $D^2$ are each independently of the other the radical of a diazocomponent of the aniline series,
$R^1$ is hydrogen or $C_1$-$C_4$-alkyl and
$R^2$ and $R^3$ are each independently of the other a radical having an external basic group.

3 Claims, No Drawings

RECORDING FLUID CONTAINING PHENYL AZO NAPHTHALENE DYES FOR THE INK JET PROCESS

The present invention relates to a novel recording fluid for the ink jet process, containing a water-miscible organic solvent and a monoazo or disazo dye whose diazo component(s) is or are derived from substituted or unsubstituted aniline and whose coupling component is derived from 1-hydroxynaphthalene-3-sulfonic acid bonded by an aminotriazine ring to an external basic group.

The ink jet process is known per se. In this process, droplets of a writing fluid are directed from one or more small nozzles at a substrate, for example paper, wood, textiles, plastic material or metal, in an electronically controlled manner whereby the individual droplets are organized into characters or graphic patterns.

Recording fluids suitable for the ink jet process generally contain dyes which are soluble in water and/or organic solvents as colorants. However, some of these dyes have deficient application properties, for example poor water fasteness or smudge resistance.

It is an object of the present invention to provide a novel ink jet process recording fluid in which the dyes present invention should have a favorable range of application properties.

We have found that this objects is achieved with a novel recording fluid for the ink jet process, containing a dye and a water-miscible organic solvent, wherein the dye is a dye of the formula I

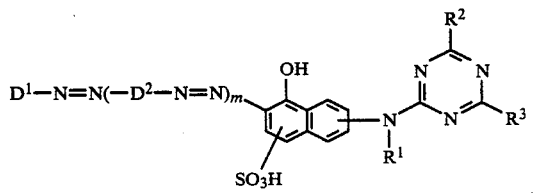

where
m is 0 or 1,
$D^1$ and $D^2$ are indentical or different and each is independently of the other a radical of a diazo component derived from unsubstituted or $C_1$–$C_4$-alkyl-, $C_1$–$C_4$-alkoxy-, phenoxy-, halogen-, nitro-, cyano- or phenylcarbamoylsubstituted aniline,
$R^1$ is hydrogen or $C_1$–$C_4$-alkyl and
$R^2$ and $R^3$ are identical or different and each is independently of the other a radical of the formula II or III

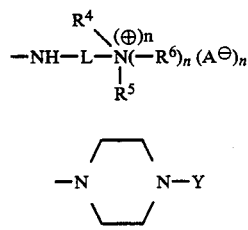

where $A\ominus$ is an anion, L is $C_2$–$C_6$-alkylene which may interrupted by oxygen, imino or $C_1$–$C_4$-alkylimino, n is 0 or 1, $R^4$, $R^5$ and $R^6$ are identical or different and each is indepenently of the others hydrogen or $C_1$–$C_4$-alkyl which may be substituted by hydroxyl, or $R^4$ and $R^5$ together with the nitrogen atom joining them are pyrrolidino, piperidino, morpholino, piperazino or N-($C_1$–$C_4$-alkyl)piperazino, and Y is hydrogen, $C_1$–$C_4$-alkyl which may be substituted by hydroxyl, or is the radical

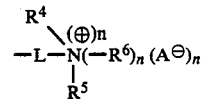

where n, $R^4$, $R^5$, $R^6$ and $A\ominus$ are each as defined above.

All the alkyl and alkylene radicals appearing in the abovementioned formulae may be not only straight-chain but also branched.

If the radicals $D^1$ and $D^2$ are derived from substituted aniline, suitable substituents, besides those already mentioned, are for example methyl, ethyl, propyl, isopropyl, butyl, isobutyl, sec-butyl, tert-butyl, methoxy, ethoxy, propoxy, isopropoxy, butoxy or sec-butoxy.

The radicals $D^1$ and $D^2$ are derived for example from aniline, 2-methylaniline, 3-methylaniline, 2-methoxyaniline, 3-methoxyaniline, 2-chloroaniline, 3-chloroaniline, 2-nitroaniline, 3-nitroaniline, 2-cyanoaniline or 3-cyanoaniline.

$R^1$, $R^4$, $R^5$, $R^6$ and Y are each for example methyl, ethyl, propyl, isopropyl, butyl, isobutyl or secbutyl.

$R^4$, $R^5$, $R^6$ and Y are each further for example 2-hydroxyethyl, 2- or 3-hydroxypropyl or 2- or 4-hydroxybutyl.

L is for example ethylene, trimethylene, tetramethylene, pentamethylene, hexamethylene, 1-methylethylene, 1,2-dimethylethylene, 2-methyltrimethylene, 2-oxatrimethylene, 2-azatrimethylene, 2-aza-2-methyltrimethylene, 3-oxapentamethylene, 3-azapentamethylene or 3-aza-3-methylpentamethylene.

Anions $A\ominus$ are derived from inorganic or organic acids and are for example fluoride, chloride, bromide, hydrogensulfate, sulfate, aminosulfate, methosulfate, ethosulfate, perchlorate, tetrafluoroborate, trichlorozincate, methanesulfonate, benzenesulfonate, p-toluenesulfonate, formate, acetate, propionate, lactate, benzoate, oxalate or succinate.

Preference is given to a recording fluid containing dyes of the formula Ia

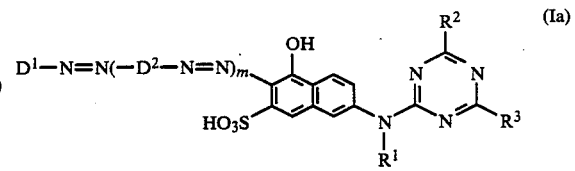

where
$D^1$ and $D^2$ are identical or different and each is independently of the other a radical of a diazo component derived from unsubstituted or methyl- or methoxy-substituted aniline,
$R^1$ is hydrogen or methyl and
m, $R^2$ and $R^3$ are each as defined above.

Particular preference is given to a recording fluid containing dyes of the formula Ia where $D^1$ and $D^2$ are each derived from unsubstituted aniline.

The dyes of the formula I are mostly known and described for example in DE-A-2,915,323 or DE-A-3,114,088 or can be obtained by the methods recited therein (loc. cit.).

The novel recording fluid for the ink jet process contains one or more dyes of the formula I and a water-miscible organic solvent.

Water-miscible organic solvents are for example $C_1$–$C_4$-alkanols, such as methanol, ethanol, propanol, isopropanol, butanol, isobutanol, sec-butanol or tert-butanol, carboxamides, such as N,N-dimethylformamide or N,N-dimethylacetamide, lactams, such as N-methylpyrrolid-2-one, cyclic ureas, such as 1,3-dimethylimidazolidin-2-one, ketones or ketoalcohols, such as acetone, methyl ethyl ketone or 2-methyl-2-hydroxypentan-4-one, ethers, such as tetrahydrofuran or dioxane, mono-, di- or polyalkylene glycols or thioglycols with $C_2$–$C_6$-alkylene units, such as ethylene glycol, 1,2- or 1,3-propylene glycol, 1,2- or 1,4-butylene glycol, 1,6-hexylene glycol, diethylene glycol, triethylene glycol, thiodiglycol, polyethylene glycol or polypropylene glycol, other polyols, such as glycerol or hexane-1,2,6-triol, $C_1$–$C_4$-alkyl ethers of polyhydric alcohols, such as ethylene glycol monomethyl or monoethyl ether, diethylene glycol monomethyl or monoethyl ether or triethylene glycol monomethyl or monoethyl ether, or dimethyl sulfoxide.

Water-miscible organic solvents which ar preferred are for example N-methylpyrrolidin-2-one, mono-, di- or trialkylene glycols with $C_2$–$C_6$-alkylene units, in particular mono-, di- or triethylene glycol, or dimethyl sulfoxide. Very particular preference is given to N-methylpyrrolidin-2-one, diethylene glycol and dimethyl sulfoxide.

The proportion of dye of the formula I is in general from 2 to 10% by weight, preferably from 3 to 5% by weight, each percentage based on the total weight of the recording fluid.

Preference is given to a recording fluid which, besides the dye of the formula I and a water-miscible organic solvent, additionally contains water.

In this case, the novel recording fluid for the ink jet process contains in general from 50 to 95% by weight, in particular from 70 to 95% by weight, each bases on the total weight of the solvent system, of water.

The novel recording fluid may also contain assistants, for example agents for affecting the viscosity, such as polyvinyl chloride or cellulose derivatives, surfactants (nonionic, anionic or cationic) or buffer systems.

The following examples will explain the invention in more detail:

General method for preparing a recording fluid

From 3.5 to 5 parts by weight of a dye which has been freed from electrolytes by the conventional method of reverse osmosis are dissolved in from 95 to 96.5 parts by weight of a liquid whose composition is given in the Examples below. The solution is pressure filtered through a Teflon filter of pore size 1 μm and then devolatilized under reduced pressure.

This recording fluid is charged to the receiving vessel of an ink jet printing head which expels the ink in droplet form under the action of supplied heat. This thermal ink jet printing head is used to print a commercial type of paper as used for typescript. The smudge resistance of the script obtained is tested by two methods:

Methods 1: marking the scripts with a commercial text marker method 2: rubbing a written area with a moistened finger The fastness of the script is assessed on a scale from 5 to 1, where 5 denotes the absence of bleeding and 1 denotes that the script has become so smudged that it is no longer legible.

The inks were prepared using the dyes of the formula

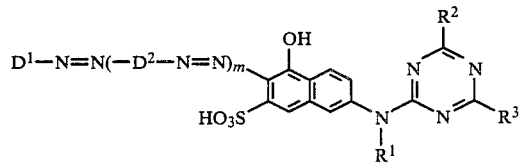

described in Table 1.

| Dye No. | $R_1$ | m | $D_1$ | $D_2$ | $R^2 = R^3$ | Color |
|---|---|---|---|---|---|---|
| 1 | H | 0 | CH₃—C₆H₄— | — | $-NH-C_3H_6-N(C_2H_5)_2$ | orange |
| 2 | H | 0 | C₆H₅—NHCO—C₆H₄— | — | $-NH-C_3H_6-N(CH_3)_2$ | orange |
| 3 | H | 0 | C₆H₅—O—C₆H₄— | — | $-NH-C_3H_63N(CH_3)_2$ | yellowish red |
| 4 | H | 1 | C₆H₅— | C₆H₄— | $-NH-C_3H_6-N(C_2H_5)_2$ | red |

-continued

| Dye No. | R₁ | m | D₁ | D₂ | R² = R³ | Color |
|---|---|---|---|---|---|---|
| 5 | H | 1 | phenyl | phenyl | —NH—C₂H₄—N(C₂H₅)₂ | red |
| 6 | H | 1 | phenyl | phenyl | —N(piperazino)N—C₂H₄OH | red |
| 7 | H | 1 | phenyl | phenyl | —N(piperazino)N—CH₃ | red |
| 8 | H | 1 | phenyl | phenyl | —N(piperazino)N—C₂H₄NH₂ | red |

Dyes 1, 2, 3, 4 and 5 were prepared as described in Examples 94, 95, 84, 98 and 100 of DE-A-2,915,323 and dyes 6 and 7 as described in Example 2 of DE-A-3,114,088. Dye 8 was prepared similarly to Example 2 of DE-A-3,114,088.

The composition of the inks and the smudge resistance ratings of the script are reported in Table 2. The water-miscible solvent (diethylene glycol or a mixture of diethylene glycol and N-methylpyrrolidin-2-one) are abbreviated to DEG and NMP. W denotes water.

TABLE 2

| Application Example No. | Dye No. | Proportion of dye in recording fluid [% by weight] | Composition of solvent system [parts by weight] | Color | Fastness by Method 1 | Fastness by Method 2 |
|---|---|---|---|---|---|---|
| 1 | 1 | 5.0 | W:DEG = 9:1 | orange | 4 | 3–4 |
| 2 | 2 | 4.0 | W:DEG:NMP = 7:2:1 | orange | 4 | 4 |
| 3 | 3 | 4.5 | W:DEG = 9:1 | yellowish red | 3–4 | 3 |
| 4 | 4 | 3.5 | W:DEG = 9:1 | red | 3 | 3–4 |
| 5 | 5 | 3.5 | W:DEG:NMP = 7:2:1 | red | 3 | 3–4 |
| 6 | 6 | 4.0 | W:DEG = 9:1 | red | 3–4 | 3 |
| 7 | 7 | 4.0 | W:DEG = 9:1 | red | 4 | 3–4 |
| 8 | 8 | 4.5 | W:DEG = 9:1 | red | 3–4 | 3–4 |

We claim:
1. A recording fluid for the ink jet process, containing 2-10% by weight of a dye and a water-miscible organic solvent, wherein the dye is a dye of the formulat I

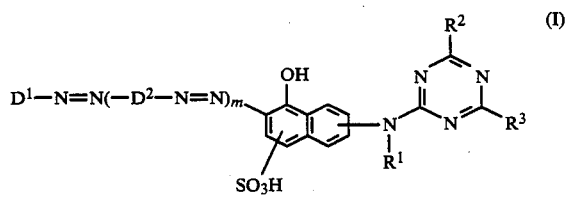
(I)

where
m is 0 or 1,
D¹ and D² indentical or different and each is independently of the other a radical of a diazo component consisting of unsubstituted phenyl or phenyl substituted by $C_1$–$C_4$-alkyl-, $C_1$–$C_4$-alkoxy-, phenoxyl-, halogen-, nitro-, cyano- or phenylcarbamoyl,
$R^1$ is hydrogen or $C_1$–$C_4$-alkyl and
$R^2$ and $R^3$ are identical or different and each is independently of the other a radical of the formula II or III

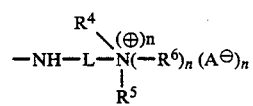
(II)

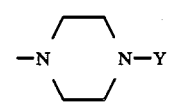
(III)

where $A^\ominus$ is an anion, L is $C_2$–$C_6$-alkylene or $C_2$–$C_6$-alkylene interrupted by oxygen, imino or $C_1$–$C_4$-alkylimino, n is 0 or 1, $R^4$, $R^5$ and $R^6$ are identical or different and each is independently of the others hydrogen, $C_1$–$C_4$-alkyl or $C_1$–$C_4$-alkyl substituted by hydroxyl, or $R^4$ and $R^5$ together with the nitrogen atom joining them are pyrrolidino, piperidino, morpholino, piperazino or N-($C_1$–$C_4$-alkyl)piperazino, and Y is hydrogen, $C_1$–$C_4$-alkyl, or $C_1$–$C_4$-alkyl substituted by hydroxyl, or is the radical

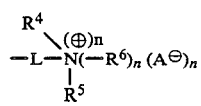

where n, $R^4$, $R^5$, $R^6$ and $A^{\ominus}$ are each as defined above.

2. A recording fluid as claimed in claim 1 containing a dye of the formula Ia

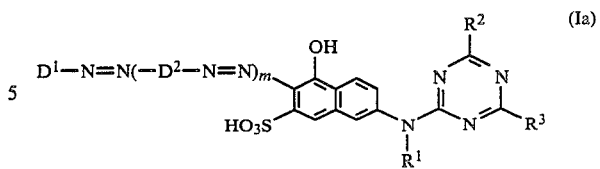

where
$D^1$ and $D^2$ are identical or different and each is independently of the other a radical of a diazo component consisting of unsubstituted phenyl or phenyl substituted with methyl- or methoxy, and $R^1$ is hydrogen or methyl.

3. A recording fluid as claimed in claim 1, which additionally contains 50 to 95% by weight water.

* * * * *